(12) United States Patent
Sheldon et al.

(10) Patent No.: US 10,360,737 B2
(45) Date of Patent: Jul. 23, 2019

(54) SYSTEM AND METHOD FOR IMPROVED DRIVE SYSTEM DIAGNOSTICS

(71) Applicant: SIKORSKY AIRCRAFT CORPORATION, Stratford, CT (US)

(72) Inventors: Jeremy Sheldon, Herietta, NY (US); David Kasper, Shelton, CT (US); Mark W. Davis, Southbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/301,152

(22) PCT Filed: Apr. 2, 2015

(86) PCT No.: PCT/US2015/024013
§ 371 (c)(1),
(2) Date: Sep. 30, 2016

(87) PCT Pub. No.: WO2015/153845
PCT Pub. Date: Oct. 8, 2015

(65) Prior Publication Data
US 2017/0011560 A1    Jan. 12, 2017

Related U.S. Application Data

(60) Provisional application No. 61/974,101, filed on Apr. 2, 2014.

(51) Int. Cl.
*G07C 5/00* (2006.01)
*G05B 23/02* (2006.01)
*B64D 45/00* (2006.01)

(52) U.S. Cl.
CPC .............. *G07C 5/00* (2013.01); *B64D 45/00* (2013.01); *G05B 23/02* (2013.01); *B64D 2045/0085* (2013.01)

(58) Field of Classification Search
CPC .......... G07C 5/00; G05B 23/02; B64D 45/00; B64D 2045/0085
See application file for complete search history.

(56) References Cited

U.S. PATENT DOCUMENTS 3,464,651 A * 9/1969 Lightfoot ................ B64C 27/12
244/17.13
5,495,907 A * 3/1996 Data ...................... B60K 6/365
180/65.245

(Continued)

FOREIGN PATENT DOCUMENTS

CA         2869923 A1    10/2013
WO     2013120103 A1     8/2013

OTHER PUBLICATIONS

IHST—International Helicopter Safety Team, Health and Usage Monitoring Systems Toolkit; Feb. 11, 2013; [retrieved on Jun. 5, 2015] <http://www.ihst.org/portals/54/Toolkit_HUMS.pdf>.

(Continued)

*Primary Examiner* — Frederick M Brushaber
(74) *Attorney, Agent, or Firm* — Cantor Colburn LLP

(57) ABSTRACT

A method of drive system diagnostics of an aircraft includes capturing high load drivetrain component vibration data at select steady-state and/or high-load transient operating conditions of the aircraft and processing the captured vibration data to improve reliability and/or accuracy of captured vibration data. The processed vibration data is utilized to provide a health assessment of the drivetrain components and achieve earlier detection of incipient faults. A health monitoring system for drivetrain components of an aircraft includes a plurality of vibration sensors positioned at drivetrain components of an aircraft to capture drivetrain component vibration data at transient operating conditions of the aircraft. One or more processing modules process the captured vibration data to improve reliability and/or accuracy of (Continued)

the captured data, and a fault reasoning module calculates a health indicator of the drivetrain components.

21 Claims, 4 Drawing Sheets

(56) References Cited

U.S. PATENT DOCUMENTS

| | | | |
|---|---|---|---|
| 7,027,953 B2 | 4/2006 | Klein | |
| 8,131,420 B2* | 3/2012 | Lynch | G07C 5/085 340/425.5 |
| 8,682,509 B2 | 3/2014 | Goodrich et al. | |
| 9,849,996 B2* | 12/2017 | Judge | B64D 43/00 |
| 2005/0096873 A1 | 5/2005 | Klein | |
| 2007/0078611 A1* | 4/2007 | Huang | G01H 1/06 702/56 |
| 2008/0195273 A1* | 8/2008 | Matsuura | B60R 25/04 701/29.2 |
| 2009/0281735 A1 | 11/2009 | Bechhoefer | |
| 2010/0161244 A1* | 6/2010 | Ghoshal | G01N 29/14 702/35 |
| 2012/0035885 A1* | 2/2012 | Tarassenko | G01H 1/006 702/183 |
| 2013/0158754 A1* | 6/2013 | Gotou | B61F 5/22 701/19 |
| 2013/0274989 A1* | 10/2013 | Isom | B64D 45/00 701/31.4 |
| 2016/0108936 A1* | 4/2016 | Wang | B66C 13/066 91/426 |
| 2016/0222989 A1* | 8/2016 | Rannow | F15B 11/0445 |
| 2016/0298660 A1* | 10/2016 | Wang | E02F 9/226 |
| 2016/0298719 A1* | 10/2016 | Wang | F16F 15/023 |
| 2017/0204886 A1* | 7/2017 | Wang | B66C 13/066 |

OTHER PUBLICATIONS

Notification of Transmittal of the International Search Report and the Written Opinion of the International Searching Authority; PCT/US2015/024013; dated Jul. 8, 2015; ISR 7 pages.
Notification of Transmittal of the International Search Report and the Written Opinion of the International Searching Authority; PCT/US2015/024013; dated Jul. 8, 2015; WO 5 pages.
EP Communication; Extended European Search Report; Application No. 15772472.5-1754/3126243 PCT/US2015024013; dated Sep. 8, 2017; pp. 1-8.
International Preliminary Report on Patentability; International Application No. PCT/US2015/024013; International Filing Date: Apr. 2, 2015; dated Oct. 4, 2016; pp. 1-6.
Ames et al.; "Overload Evaluation of Rotorcraft Tail Rotor Drive Spiral Bevel Gears"; Presented at the Proceedings of the American Helicopter Society 69th Annual Forum in Phoenix, Arizona; May 2013; 12 Pages.
Bates et al.; "Technology Development to Enable Capability-Based Operations and Sustainment"; Presented at the American Helicopter Society 68th Annual Forum in Fort Worth, Texas; May 1-3, 2012; 12 Pages.
Baydar et al.; "Detection of Gear Deterioration Under Varying Load Conditions by Using the Instantaneous Power Spectrum"; Mechanical Systems and Signal Processing; vol. 14, No. 6; 2000; pp. 907-921.

Beale; "Applications of Virtual Monitoring of Loads to Engineering Decision Making"; Presented at the AHS 70th Annual Forum in Montreal, Quebec, Canada; May 20-22, 2014; 10 Pages.
Choi et al.; "Improved Time-Frequency Representation of Multicomponent Signals Using Exponential Kernels"; IEEE Transactions on Acoustics, Speech, and Signal Processing; vol. 37, No. 6; Jun. 1989; pp. 862-871.
Cohen; "Time-Frequency Distributions—A Review"; Proceedings of the IEEE; vol. 77, No. 7; Jul. 1989; pp. 941-981.
Garshelis et al.; "A Rate of Change of Torque Sensor"; IEEE Transactions on Magnetics; vol. 43, No. 6; Jun. 2007; pp. 2388-2390.
Garshelis et al.; "Monitoring Cutting Tool Operating and Condition with a Magnetoelastic Rate of Change of Torque Sensor"; Journal of Applied Physics; Version 103; 2008; 3 Pages.
Hess et al.; "SH-60 Helicopter Integrated Diagnostic System (HIDS) Program Experience and Results of Seeded Fault Testing"; Presented at the RTO AVT Specialists' Meeting on Exploitation of Structural Loads/Health Data for Reduced Life Cycle Costs in Brussels, Belgium; May 11-12, 1998; 22 Pages.
Isom et al.; "Flight Test of Technology of Virtual Monitoring of Loads"; Presented at the AHS 69th Annual Forum in Phoenix, Arizona; May 21-23, 2013; 20 Pages.
Kari et al.; "Magnetoelastic Torquemeter System for LCAC Hovercraft Turboshaft Engine Monitoring & Control"; Proceedings of the ASME Turbo Expo in Copenhagen, Denmark; Jun. 11-15, 2012; 10 Pages.
Krick et al.; "Development of Engineering Standards for Dynamic Thresholding and Trend Alert Technology for Application to a HUMS-Equipped Fleet"; Presented at the AHS CBM Specialists' Meeting in Huntsville, Alabama; Feb. 11-13, 2013; 5 Pages.
Lee et al; "Diagnosing Bearing Corrosion using Joint Time Frequency Vibration Analysis"; Presented at the American Helicopter Society 67th Annual Forum in Virginia Beach, Virginia; May 3-5, 2011; 11 Pages.
Oehlmann et al.; "A Method for Analysing Gearbox Faults Using Time-Frequency Representations"; Mechanical SYstems and Signal Processing; vol. 11, No. 4; 1997; pp. 529-545.
Reeds; "Piezoelectric Transducer Failure Modes and Effects"; Presented at the Joint EIA IEEE Electronic Components Conference in Washington D.C.; May 1966; 11 Pages.
Schoeller et al.; "An Integrated Vehicle Health Management System for Next Generation CBM"; Presented at the AHS/AIAA Airworthiness, CBM, and HUMS Specialists' Meeting in Huntsville, Alabama; Feb. 7-9, 2011; 23 Pages.
Sheldon et al.; "A Systematic Approach to Reducing Helicopter Tail Drive Shaft Maintenance"; Presented at the AHS 69th Annual Forum in Pheonix; Arizona; May 21-23, 2013; 9 Pages.
V. V. Polyshchul et al.; "Gear Fault Detection with Time-Frequency Based Parameter NP4"; International Journal of Rotating Machinery; vol. 8, No. 1; 2002; pp. 57-70.
Watson et al.; "Novel Joint Time Frequency Vibration Diagnostics of Turbine Engine Accessories"; Proceedings of ASME Turbo Expo 2010: Power for Land, Sea, and Air in Glasgow, United Kingdom; Jun. 14-18, 2010; 11 Pages.
Williams et al.; "Helicopter Transmission Fault Detection via Time-Frequency, Scale, and Spectral Methods"; Mehanical Systems and Signal Processing; vol. 14, No. 4; 2000; pp. 545-559.

* cited by examiner

SYSTEM AND METHOD FOR IMPROVED DRIVE SYSTEM DIAGNOSTICS

CROSS REFERENCE TO RELATED APPLICATIONS

This application is a National Phase Application of Patent Application PCT/US2015/024013 filed on Apr. 2, 2015 which claims priority to United States Provisional Application 61/974,101 filed on Apr. 2, 2014, the contents of which are incorporated herein by reference in their entirety.

STATEMENT OF FEDERAL SUPPORT

This invention was made with Government support under Contract No. W911W6-10-2-0006 awarded by the United States Army. The Government has certain rights in the invention.

BACKGROUND

A key function of rotorcraft Health and Usage Monitoring Systems (HUMS) is to monitor the condition or health of drive systems or mechanical drivetrains for transmitting power from a power source, for example a turbine-based engine, to one or more rotor systems used to provide aerodynamic lift, propulsion, and vehicle control. A rotorcraft drive train typically consists of gearboxes that change shaft rotational speed or direction, drive shafts that connect gearboxes to the power source or each other, and external bearings that support drive shafts that transmit power over long distances. Drive train gearboxes typically consist of internal gears, bearings, and shafts. Traditionally, the condition of each drivetrain component or subcomponent is monitored primarily through diagnostics-based analysis of changes in vibration signatures due to mechanical faults. The challenge of vibration-based drivetrain diagnostics is that vibration signatures are often very sensitive to other factors such as, for example, the power being transmitted that changes as a function of rotorcraft configuration (e.g., weight and center-of-gravity) and operating condition (e.g., flight speed, rate of climb, flight maneuver). Therefore, HUMS are typically designed to collect data in a way that allows direct comparison and trending of vibration features that are translated into condition indicators (CIs) for various component failure modes. The health of a drivetrain component is a function of the CIs for all the subcomponents and associated failure modes.

HUMS typically collect and process vibration information using one of two acquisition strategies. In the first approach, some HUMS acquire or capture vibration data continuously without regard to flight conditions. This has the advantage of acquiring many data points during a flight, but difficulty in trending vibration features or condition indicators (CIs) derived from these features because they are sensitive to variations in drivetrain loads that vary throughout the flight envelope. The high variability in vibration features or CIs and difficulty in trending them typically result in increased thresholds associated with increased damage states to achieve acceptable probability of detection and false alarm rates. In the second approach, some HUMS use regime-based data capture windows, typically acquiring vibration data only during steady-state operating conditions, such as ground runs, hover, and steady-level flight. The advantages of the second regime-based approach are reduced variability in vibration features or CIs within each regime, improved trending, and clearer detection of a change of component condition. However, the disadvantage is that the steady-state operating conditions typically occur at relatively moderate loads such that faults often do not manifest themselves until growing fairly large. Because the regime based capture windows are not a direct indication of load, there is still variability in the vibration features and CIs within a regime. For example, drivetrains must transmit higher power, using higher torque when flying at nominally the same speed at maximum gross weight versus minimum gross weight.

A third approach, which heretofore has been impractical, would be to acquire data during high-load maneuvers or regimes where many faults will manifest themselves as detectable changes in vibration features much sooner than they would during moderate load, steady-state regimes. The difficulty of this approach is that these higher loads often occur during transient maneuvers or operating states, which have even higher variability in terms of loads depending on aircraft configuration and pilot technique in flying the maneuver. Further, traditional steady-state signal processing methods are not appropriate for extracting vibration features from transient or dynamic structural vibratory responses and thus require advanced dynamic signal processing methods.

Other challenges faced by any vibration-based drive-system diagnostic approach is the additional variability and uncertainty manifested in vibration features and CIs as the result of inherently noisy vibration signals and occasional data quality issues that can result from degraded or faulted sensors, where said faults may be present only intermittently. Due to all the aforementioned (e.g., loads, noise, faulty sensors) as well as other sources of variability and uncertainty, HUMS vibration-based diagnostics typically rely on static thresholds that are relatively high to ensure confident detection of critical faults and acceptable false alarm rates. This has resulted in fairly short detection lead times that help avoid in-flight detection of critical faults and mission aborts, but have not resulted in as much improvement as desired in reduced cost of maintenance because of the lack of time to plan maintenance or order high-value spare parts.

Statistical change detection (SCD) algorithms have been developed to enable better and earlier detection of incipient faults, allowing longer detection lead times, but these SCD algorithms are still challenged by the aforementioned variability and uncertainties in CIs. Finally, advanced practical torque measurement technologies are becoming available, both physical sensor and virtual sensors that enable advanced methods of acquiring, processing, and trending vibration data.

There is a desire for a new holistic approach that exploits new enabling technologies, exploits the advantages of traditional vibration-based diagnostics, and addresses the inherent challenges of vibration-based drive system diagnostics, allowing earlier detection of drivetrain component faults, while maintaining acceptable false alarm rates, leading to longer detection lead times, reduced unscheduled maintenance, higher aircraft availability, optimized supply chain management, and reduced operational cost. This requires advanced methods for data capture, signal processing, and trending to increase the sensitivity and reduce the variability of both traditional steady-state and advanced high-load vibration features and CIs, along with advanced diagnostic algorithms for fusing traditional and new vibration features and CIs to achieve higher accuracy diagnostics, improved fault isolation, and desired improvements in maintenance efficiency.

BRIEF SUMMARY

In one embodiment, a method of drive system diagnostics of an aircraft includes capturing high load drivetrain component vibration data at select steady-state and/or high-load transient operating conditions of the aircraft and processing the captured vibration data to improve reliability and/or accuracy of the captured vibration data. The processed vibration data is utilized to provide a health assessment of the drivetrain components and achieve earlier detection of incipient faults.

Additionally or alternatively, in this or other embodiments load is sensed at one or more drivetrain component and the capture of drivetrain component vibration data is triggered when the sensed load indicates a selected operating mode for data capture.

Additionally or alternatively, in this or other embodiments parametric data of the aircraft operation is monitored and a virtual monitoring of loads module is utilized to estimate an aircraft load based on the parametric data. The capture of drivetrain component vibration data is triggered when the estimated load indicates a selected operating mode for data capture.

Additionally or alternatively, in this or other embodiments a load filtering module is utilized to correlate vibration data and associated condition indicators to parameters of aircraft load.

Additionally or alternatively, in this or other embodiments the parameters of aircraft load include closest exceedance parameters, cumulative exceedance parameters, and capture window parameters.

Additionally or alternatively, in this or other embodiments a data quality assurance module is utilized to flag suspect vibration sensors providing vibration data and to prevent suspicious vibration data from being utilized in calculating the health assessment.

Additionally or alternatively, in this or other embodiments dynamic or transient signal processing methods are utilized to reduce variability in high load vibration data and in calculated condition indicators.

Additionally or alternatively, in this or other embodiments joint time-frequency analysis is utilized to reduce the variability in the vibration data and calculated condition indicators.

Additionally or alternatively, in this or other embodiments a noise reduction algorithm is applied to the data captured during steady state.

Additionally or alternatively, in this or other embodiments a statistical change detection (SCD) module is utilized to identify trends in collected vibration data indicating an anomalous system behavior that indicates an incipient fault condition.

Additionally or alternatively, in this or other embodiments reasoning methods are utilized to combine or fuse evidence of incipient, growing or critical faults from a variety of data analysis methods and associated condition indicators, including steady-state vibration condition indicators, transient vibration condition indicators, and data quality assurance indicators.

In another embodiment, a health monitoring system for drivetrain components of an aircraft includes a plurality of vibration sensors positioned at drivetrain components of an aircraft to capture drivetrain component vibration data at transient operating conditions of the aircraft. One or more processing modules process the captured vibration data to improve reliability and/or accuracy of the captured data, and a fault reasoning module calculates a health indicator of the drivetrain components.

Additionally or alternatively, in this or other embodiments a plurality of load sensors are located at one or more drivetrain components, the capture of drivetrain component vibration data triggered when a sensed torque indicates transient operation of the aircraft.

Additionally or alternatively, in this or other embodiments a virtual monitoring of loads module estimates an aircraft load based on collected parametric data of the aircraft, drivetrain component vibration data captured when the estimated load indicates transient operation of the aircraft.

Additionally or alternatively, in this or other embodiments a data quality assurance module flags suspect vibration sensors providing vibration data and to prevent suspicious vibration data from being utilized in calculating the health indicator.

Additionally or alternatively, in this or other embodiments the captured vibration data is processed to reduce variability in the vibration data.

Additionally or alternatively, in this or other embodiments joint time-frequency analysis is utilized to reduce the variability in the vibration data.

Additionally or alternatively, in this or other embodiments a noise reduction algorithm is utilized to improve a signal to noise ratio of the captured vibration data.

Additionally or alternatively, in this or other embodiments a load filtering module is utilized to correlate vibration data to parameters of aircraft load.

Additionally or alternatively, in this or other embodiments the parameters of aircraft load include closest exceedance parameters, cumulative exceedance parameters, and capture window parameters.

Additionally or alternatively, in this or other embodiments a statistical change detection module is utilized to identify trends in collected vibration data indicating an anomalous system behavior that indicates an approaching fault condition. These and other advantages and features will become more apparent from the following description taken in conjunction with the drawings.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
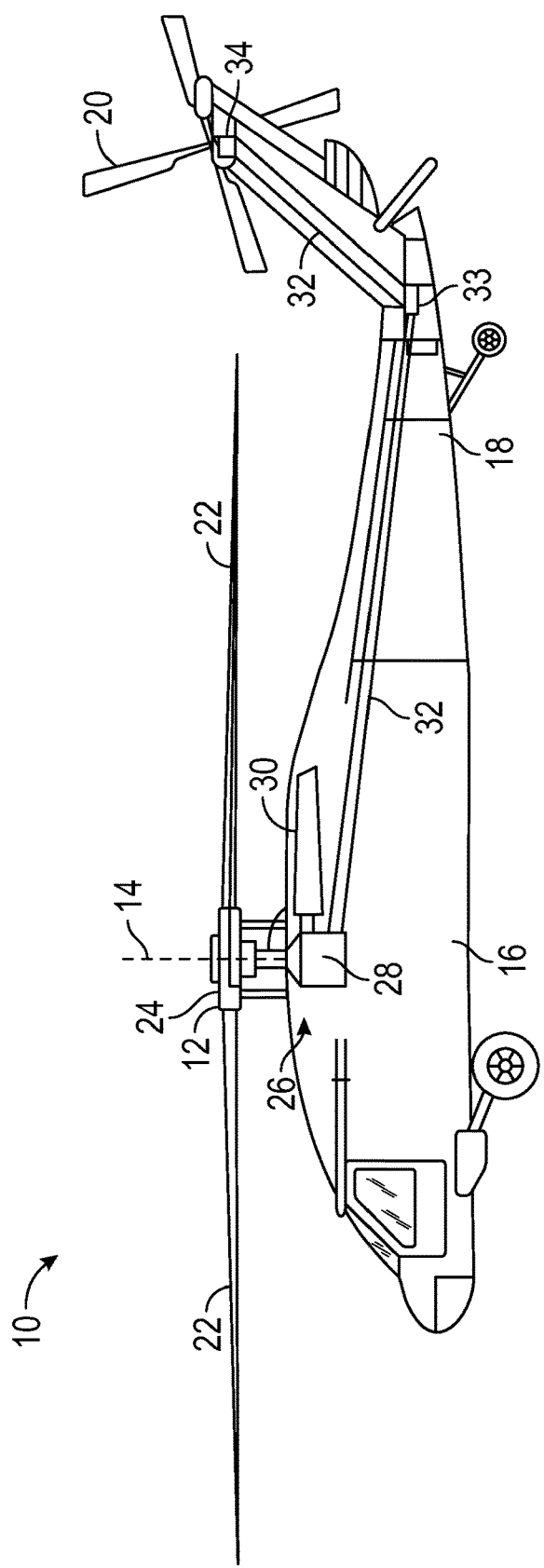
FIG. 1 is a general side view of an exemplary rotary wing aircraft for use in accordance with embodiments.

FIG. 1 illustrates an exemplary rotary-winged aircraft 10 having a main rotor system 12, which rotates about a rotor axis 14. The aircraft 10 includes an airframe 16 which supports the main rotor system 12 as well as an extending tail 18 including a tail rotor 20. The main rotor system 12 includes a plurality of rotor blade assemblies 22 mounted to a rotor hub assembly 24. The main rotor system 12 is driven by a transmission 26. The transmission 26 includes a main gearbox 28 driven by one or more engines, illustrated schematically at 30. The main gearbox 28 and engines 30 are considered as part of the non-rotating frame of the aircraft 10. In the case of a rotary wing aircraft, the main gearbox 28 may be interposed between one or more gas turbine engines 30 and the main rotor system 12. The aircraft further includes a tail rotor shaft 32 and one or more additional gearboxes, including typically an intermediate gearbox 33 and a tail rotor gearbox 34, connected to the transmission 26 to drive rotation of the tail rotor 20. Although a particular rotary wing aircraft configuration is illustrated and described in the disclosed non-limiting embodiment, other configurations and/or machines with rotor systems are within the scope of the present disclosure. Further, one skilled in the art will readily appreciate that the present disclosure may be utilized in other, non-rotary winged aircraft applications as well as most other mechanical drive systems found in for example ground vehicles and ground-based turbine-based power plants.

Typically for drive train components such as the main gearbox 28, tail rotor shaft 32, tail rotor gearbox 34, associated bearings and other components, vibration levels, especially of key vibration features, are a key indicator of component condition or health. While a typical HUMS utilizes vibration data in its assessment, improving the type of data collected and the methods for analyzing the collected data improves the HUMS output, thus improving the accuracy and sensitivity of the assessment of the drivetrain components, which may be utilized to develop service intervals or maintenance schedules that align better with and more accurately reflect the drivetrain components' need for maintenance. This in turn may also be utilized for a more cost-effective maintenance schedule for the aircraft.

Figure 2:
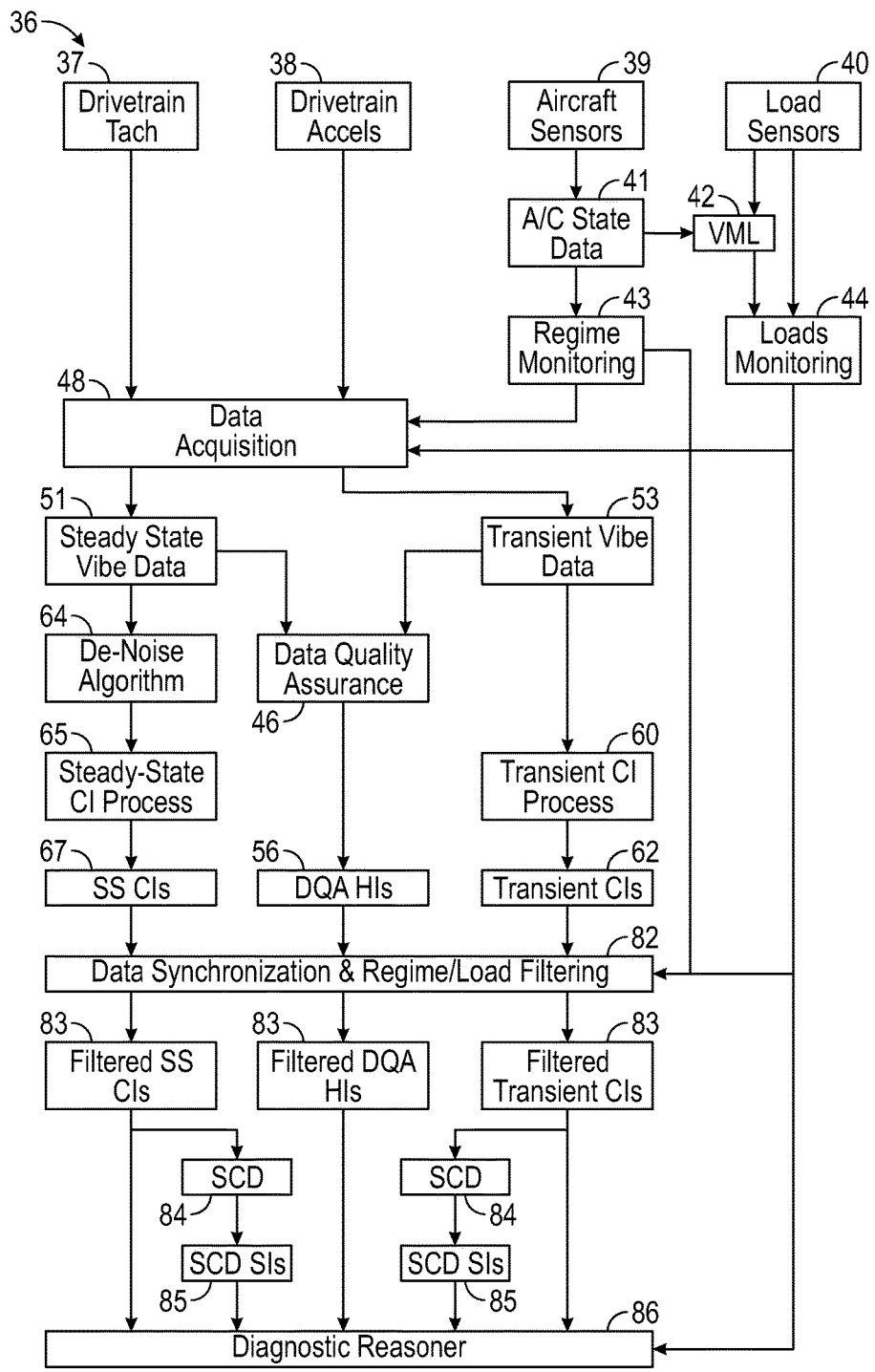
FIG. 2 is a schematic illustration of a method and system for drive system diagnostics for an aircraft.

Referring now to FIG. 2, an improved drive system mechanical diagnostic system 36 is illustrated. The system 36 utilizes vibration data collected from vibration sensors 38, for example, accelerometers located at selected drivetrain components of the aircraft 10, and tachometer sensors 37 to sense rotational speed of selected drivetrain components. In addition to collecting data at certain steady state conditions, referred to as steady state regime/load based vibration data 51, the system 36 seeks to collect other vibration data, referred to as load based transient vibration data 53, at high load or peak load operating conditions, which typically occur during transient operation of the aircraft 10 (e.g., during maneuvers or regimes). To this end, the system 36 utilizes physical load sensors 40 or estimates from virtual monitoring of loads 42 for loads monitoring 44 of key drive system loads such as torque to trigger vibration data acquisition during desired load-based capture windows (typically high-load maneuvers that are often transient in nature). The load sensors 40 can be any type of load sensor 40, including non-contact torque sensors, placed at the selected drivetrain components. In addition, the system 36 utilizes regime monitoring 43 using aircraft state data 41 to determine selected steady state conditions and trigger collection of data from the vibration sensors 38 and tachometer sensors 37.

Alternatively, or in addition to the physical load sensors 40, the system 36 may utilize a virtual monitoring of loads (VML) module 42, to trigger the collection of data from the vibration sensors 38 and/or tachometer sensors 37 via loads monitoring module 44. The VML module 42 utilizes aircraft state or parametric data measured by or derived from various aircraft sensors 39 and at times data from selected load sensors 40 to estimate loads via an empirical model. Said aircraft state or parametric data may include measured aircraft 10 operating states (e.g., forward flight speed, aircraft attitude, altitude, rates of change in operating states) or derived parameters (e.g., rates of change in operating states, regimes, aircraft gross weight, aircraft center of gravity) calculated from other aircraft state parameters. The VML model 42 approach is advantageous in that no additional hardware in the form of torque sensors may be required.

As described above, using both regimes and loads to trigger data collection results in two types of data, respectively: (i) steady state regime/load based vibration data, or steady state vibration data 51 and (ii) load based transient vibration data, or transient data 53. Each of these data types requires further processing to extract features, CIs, from the signals that are characteristic of potential system faults. In order to achieve high quality results, each type of data is analyzed with a series of specific algorithms primarily focused on reducing variability of the results. The specific algorithms may be specifically tailored to the particularities of the data, whether steady state or transient.

Accelerometers and other vibration sensors 38 have proven to be reliable for determining drivetrain component faults, but the vibration sensors 38 cannot be assumed to be fault free, and the data 100% reliable. Thus, a data quality assurance (DQA) module 46 is utilized to flag suspect vibration sensors 38, for both the steady state vibration data 51 and the transient vibration data 53 since both data is from identical sensors, for maintenance activity and to prevent suspicious data from being utilized in mechanical diagnostics by the system 36.

Figure 3:
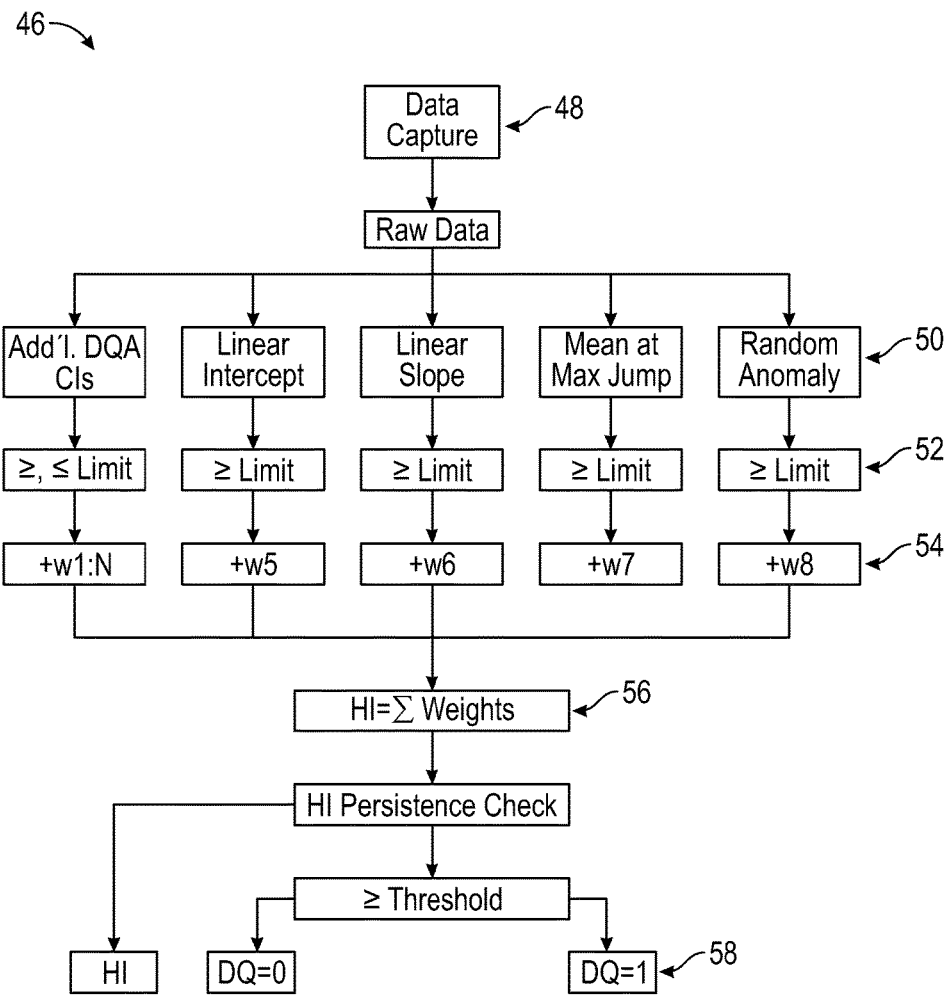
FIG. 3 is a schematic illustration of a data quality assessment algorithm for a drive system diagnostic system.

The DQA module 46 is schematically shown in more detail in FIG. 3. The DQA module 46 receives raw data, both the steady state vibration data 51 and the transient vibration data 53 as input from the data acquisition module 48. The DQA module 46 calculates a number of data condition indicators (CI's) 50, and the results are compared to data CI thresholds 52 for each respective data CI 50 to arrive at a data CI flag 54 for each data CI 50. The data CI's 50 include, but are not limited to, linear intercept, linear slope, mean at maximum jump, and random anomaly. The linear intercept data CI 50 is based on a linear fit of the raw data and using an intercept to detect a first order response seen in the data from intermittent connections. The linear slope data CI 50 is based on the linear fit of the raw data and using a slope to detect the first order response seen in the data from intermittent connections. The mean at maximum jump data CI 50 is intended to detect failure modes that would cause sensor power to be suddenly cut, dropping the signal, and then immediately reinstated, characterized by a first order response. Such faults may include intermittent open or shorted cabling or connectors. The CI calculation divides the time series data into two segments at the point of maximum jump. The difference in the mean of the two segments is then calculated. For healthy signals, this difference will be close to zero, but a more significant difference may be indicative of a fault. Finally, the random anomaly data CI 50 evaluates a signal for corruption based on a difference between the mean and the variance in the signal. The algorithm is intended to detect isolated random events, typically caused by wiring faults or packet loss.

The data CI flags 54 are weighted and summed to arrive at a data health indicator (HI) 56. The data HI 56 is compared to a threshold and determination is made whether to trip a DQA flag 58 based on the comparison.

Referring again to FIG. 2, the data from the data acquisition module 48 is processed to reduce data CI 50 variability during both regime-based steady-state and load-based (often transient) dynamic operation. One exemplary processing method is joint time-frequency analysis (JTFA) applied to the transient vibration data 53. The transient CI process module 60 uses the JTFA to transform the time-domain signal of the transient vibration data 53, in this case demodulated vibration, into a three dimensional representation of energy versus both time and frequency, thus expanding the dimensionality of the data, which is better suited for extracting high quality vibration features (CIs) from the data obtained from transient operational states, like those typically associated with high loads, of the aircraft 10. The transient CI process module 60 produces additional transient vibration data CI's 62.

Figure 4:
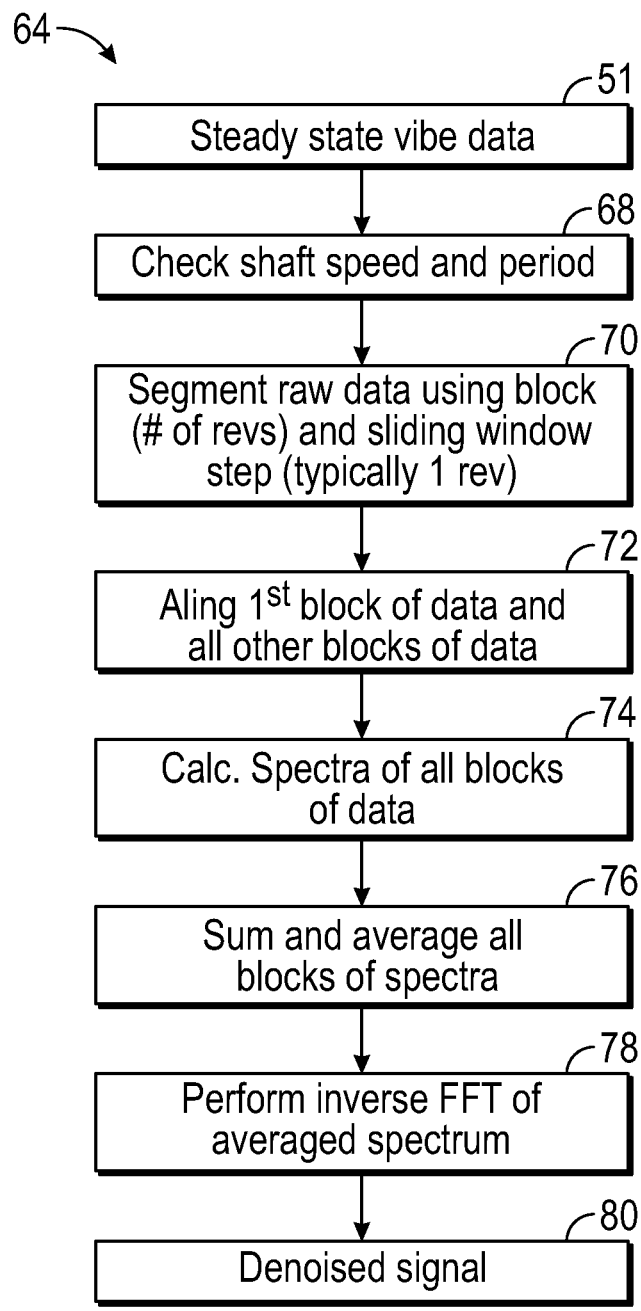
FIG. 4 is a schematic illustration of a denoising algorithm for a drive system diagnostic system.

Some of the frequency-based CI's 50, for example, bearing fault CI's, are known to be erratic and in some cases, unreliable. Often this is due to a lower than optimal signal to noise ratio of the vibration signal. To improve the signal to noise ratio for steady state vibration data 51, a noise reduction algorithm 64 is applied to the data. Although this technique may appear similar to time synchronous averaging processes commonly used for gears, in this instance the approach is applied to bearings. Referring now to FIG. 4, the noise reduction algorithm 64 will be described in more detail. Initially, the raw steady state vibration data 51 is input into the noise reduction algorithm 64, and the shaft speed and period are checked at block 68. The raw vibration data 51 is segmented at block 70 with predefined block sizes, in this case a block size corresponding to one revolution, and a sliding window step. At block 72, a phase compensation method is applied to align each segment of data with the first block of segmented data. The aligned blocks of data are transformed into spectra at block 74, which are then summed and averaged at block 76. At block 78, the averaged spectrum is inversely transformed to a time waveform, i.e. a signal with improved signal to noise ratio, at block 80. Referring now to FIG. 2, the improved signal to noise ratio of the signal output of block 80, allows the bearing fault frequencies CI 50 calculated in steady state CI process module 65 to be more readily and consistently identifiable. The more reliable output of steady state CI process module 65 is a set of steady state CIs 67.

Some drivetrain faults are more readily detected when the drivetrain component is under a specific type or level of load. Thus, embodiments of system 36 include a load filtering module 82 to trend drivetrain CIs by load level, or only for specific loads. The CIs are synchronized to the load data, and certain statistics of the load data are calculated, and the CIs then may be filtered by one or more of the calculated statistics. The statistics may include statistics (such as mean, maximum, median, etc. of the load above some predefined importance level) used to correlate instances in time of drivetrain component CIs to instances in time where the load exceeds a threshold; cumulative statistical parameters statistics (such as running mean, maximum, median, etc. of the load above some predefined importance level over the entirety of time), used to correlate component CIs to a sum of instances where the load exceeds the threshold; load-based capture window parameters, such as mean load, peak load or load standard deviation; and parameters used to characterize load data that occurred between instances of CIs. The output of the load filtering module 82 is a set of filtered CIs 83.

Additionally, to provide earlier detection of faults, embodiments of system 36 utilize a statistical change detection (SCD) module 84. The SCD module 84 evaluates trends in vibration data, which while still may be well below traditional threshold for detecting a fault, show early trends of an incipient fault or a growing fault approaching the threshold. The SCD module 84 may evaluate the vibration data, filtered CIs 83, utilizing, for example, a mean trend test, a scatter test, and/or a mean gap test to establish new SCD-based CIs 85.

Finally, a failure fault mode reasoning module 86 evaluates the processed vibration data from all of the sources, including the loads monitoring 44, SQA module 46, JFTA module 60, load filtering module 82, noise reduction algorithm 64, and SCD-based CIs 85. Due to the large number of CIs, components, and potentially complicated interactions between faults, it can be difficult to determine the best corrective action based upon typical information provided by a HUMS. A user of current HUMS information often has to simultaneously determine what, if any, component fault may exist from dozens of CI values and trends. Therefore, to reduce false alarms, improve diagnostics, and focus maintenance actions, a drive system fault-failure mode reasoner 86 is used. The reasoner combines and corroborates data from multiple sources to generate fault/failure mode rankings. The reasoner 86 is employed to infer the root cause of fault conditions with a degree of accuracy and confidence higher than what can be achieved from any single observation or CI, or even from a scalar health index that might be used to combine multiple CIs for a gearbox, for example. The rationale is that the information value of a network is greater than the sum of its individual parts. The reasoner module 86 utilizes a dependency model to calculate a ranked group of most likely causes or fault/failure modes with consideration of all of the available evidence. This ranked list of failure modes can then be used to determine the optimal remedial action, from a safety, cost, and effectiveness standpoint.

The system 36 captures and utilizes data captured at both steady-state and high-load transient operating conditions to provide a more accurate indication of drivetrain component condition and earlier indication of incipient faults. Further, the captured data is processed by the system to ensure more accurate and reliable results are obtained. The system results in reductions in unscheduled maintenance by reducing ambiguities and false alarms associated with scheduled maintenance findings or on-aircraft exceedances. Operational safety and reliability are improved, because the more accurate diagnostics provide earlier fault indications prior to progression to failure. Finally more efficient maintenance and reduced cost of operation are achieved by higher accuracy, longer detection lead times that allow efficient maintenance planning and pre-ordering of high-value components not normally maintained in inventory.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of drive system diagnostics of an aircraft comprising:

performing loads monitoring of key drive system loads utilizing physical load sensors or estimates from virtual monitoring of loads;

capturing high load drivetrain component vibration data at select steady-state conditions and load based transient vibration data at select high-load transient operating conditions of the aircraft, wherein capturing the high load drivetrain component vibration data and the load based transient vibration data is triggered by the loads monitoring during desired load-based capture windows;

processing the captured vibration data to improve reliability and/or accuracy of the captured vibration data;

utilizing the processed vibration data to provide a health assessment of the drivetrain components and achieve earlier detection of incipient faults, wherein the health assessment includes outputting a ranked list of failure modes that can be used to determine a necessary corrective action; and scheduling a maintenance operation in response to the ranked list of failure modes.

2. The method of claim 1, wherein capturing drivetrain component vibration data is triggered when the sensed load indicates a selected operating mode for data capture.

3. The method of claim 1, wherein capturing drivetrain component vibration data is triggered when the estimated load indicates a selected operating mode for data capture.

4. The method of claim 1, further comprising utilizing a load filtering module to correlate vibration data and associated condition indicators to parameters of aircraft load.

5. The method of claim 4, wherein the parameters of aircraft load include closest exceedance parameters, cumulative exceedance parameters, and capture window parameters.

6. The method of claim 1, further comprising utilizing a data quality assessment module to flag suspect vibration sensors providing vibration data and to prevent suspicious vibration data from being utilized in calculating the health assessment.

7. The method of claim 1, further comprising: utilizing dynamic or transient signal processing methods to reduce variability in high load vibration data and in calculated condition indicators.

8. The method of claim 7, further comprising utilizing joint time-frequency analysis to reduce variability in the vibration data and calculated condition indicators.

9. The method of claim 1, further comprising applying a noise reduction algorithm to the data captured during steady state.

10. The method of claim 1, further comprising utilizing a statistical change detection (SCD) module to identify trends in collected vibration data indicating an anomalous system behavior that indicates an incipient fault condition.

11. The method of claim 1, further comprising the use of reasoning methods to combine or fuse evidence of incipient, growing or critical faults from a variety of data analysis methods and associated condition indicators, including steady-state vibration condition indicators, transient vibration condition indicators, and data quality assurance indicators.

12. A health monitoring system for drivetrain components of an aircraft comprising:
at least one of a physical load sensor and a virtual monitoring of loads module for monitoring key drive system loads;
a plurality of vibration sensors disposed at drivetrain components of an aircraft to capture drivetrain component vibration data at select steady-state conditions and load based transient vibration data at select high-load transient operating conditions of the aircraft, vibration data acquisition by the plurality of vibration sensors being triggered during desired load-based capture windows in response to the key drive system loads
one or more processing modules to process the captured vibration data to improve reliability and/or accuracy of the captured data; and
a fault reasoning module in communication with the one or more processing modules, the fault reasoning module being operable to calculate a health indicator of the drivetrain components, wherein the fault reasoning module uses the health indicator of the drivetrain components to output a ranked list of failure modes that can be used to determine a necessary corrective action and schedule maintenance for the aircraft to perform the necessary corrective action.

13. The system of claim 12, the capture of drivetrain component vibration data triggered when a sensed torque indicates transient operation of the aircraft.

14. The system of claim 12, wherein the virtual monitoring of loads module is operable to estimate an aircraft load based on collected parametric data of the aircraft, drivetrain component vibration data captured when the estimated load indicates transient operation of the aircraft.

15. The system of claim 12, further comprising a data quality assessment module to flag suspect vibration sensors providing vibration data and to prevent suspicious vibration data from being utilized in calculating the health indicator.

16. The system of claim 12, further comprising processing the captured vibration data to reduce variability in the vibration data.

17. The system of claim 16, further comprising utilizing joint time-frequency analysis to reduce variability in the vibration data.

18. The system of claim 12, further comprising a noise reduction algorithm to improve a signal to noise ratio of the captured vibration data.

19. The system of claim 12, further comprising a load filtering module to correlate vibration data to parameters of aircraft load.

20. The system of claim 19, wherein the parameters of aircraft load include closest exceedance parameters, cumulative exceedance parameters, and capture window parameters.

21. The system of claim 12, further comprising a statistical change detection module to identify trends in collected vibration data indicating an anomalous system behavior that indicates an approaching fault condition.

* * * * *